United States Patent
Mae

(10) Patent No.: US 7,856,167 B2
(45) Date of Patent: Dec. 21, 2010

(54) IMAGE PLAYBACK APPARATUS AND METHOD, AND PROGRAM

(75) Inventor: Atsushi Mae, Tokyo (JP)

(73) Assignee: Sony Corporation, Tokyo (JP)

( * ) Notice: Subject to any disclaimer, the term of this patent is extended or adjusted under 35 U.S.C. 154(b) by 1005 days.

(21) Appl. No.: 10/590,708

(22) PCT Filed: Sep. 13, 2005

(86) PCT No.: PCT/JP2005/016819

§ 371 (c)(1),
(2), (4) Date: Aug. 25, 2006

(87) PCT Pub. No.: WO2006/070514

PCT Pub. Date: Jul. 6, 2006

(65) Prior Publication Data

US 2007/0183755 A1    Aug. 9, 2007

(30) Foreign Application Priority Data

Dec. 28, 2004    (JP) .............................. 2004-381237

(51) Int. Cl.
*H04N 5/91* (2006.01)
(52) U.S. Cl. ........................ 386/68; 386/111
(58) Field of Classification Search .................. 386/46, 386/68, 95, 111, 112, 125, 126
See application file for complete search history.

(56) References Cited

U.S. PATENT DOCUMENTS

| | | | | |
|---|---|---|---|---|
| 5,974,224 A | * | 10/1999 | Nagata | 386/109 |
| 5,991,502 A | * | 11/1999 | Kawakami et al. | 386/109 |
| 6,141,491 A | * | 10/2000 | Yamagishi et al. | 386/109 |

FOREIGN PATENT DOCUMENTS

| | | |
|---|---|---|
| JP | 08-098142 | 4/1996 |
| JP | 10-271444 | 10/1998 |
| JP | 2001-211405 | 8/2001 |

\* cited by examiner

*Primary Examiner*—Huy T Nguyen
(74) *Attorney, Agent, or Firm*—Finnegan, Henderson, Farabow, Garrett & Dunner, LLP

(57) ABSTRACT

The present invention relates to an image playback apparatus and method, and a program for enabling a quick display of a last picture of moving pictures during fast forward playback as well as a first picture of the moving pictures during fast reverse playback. Concerning GOPs from a GOP at which the fast forward playback is started to a GOP#(N−1) that is immediately prior to a last GOP#N, encoded video data of I-pictures is stacked in a stream buffer, whereas concerning the last GOP#N, the encoded video data of all frames is stacked in the stream buffer. To the last GOP#N, only I-pictures are decoded and displayed. Thereafter the I-picture and the P-pictures in the last GOP#N is decoded, and only the last picture is displayed. The present invention can be applied to DVD players or the like.

20 Claims, 11 Drawing Sheets

IMAGE PLAYBACK APPARATUS AND METHOD, AND PROGRAM

TECHNICAL FIELD

The present invention relates to image playback apparatuses and methods, and programs. More particularly, the present invention relates to an image playback apparatus and method, and a program for enabling a quick display of a last picture of moving pictures at the end of fast forward playback and a first picture of the moving pictures at the end of fast reverse playback, when the fast forward playback or the fast reverse playback of encoded moving pictures is performed.

BACKGROUND ART

Suppose that fast forward playback or fast reverse playback of moving pictures in MPEG (Moving Picture Experts Group)2 format recorded on recording media, such as, for example, DVDs (Digital Versatile Discs) is performed. In the fast forward playback, the moving pictures are played back in a forward direction at a speed faster than a normal playback speed, whereas in the fast reverse playback, the moving pictures are played back in a reverse direction at a speed faster than the normal playback speed.

FIG. 1 shows an example of a structure of moving pictures in MPEG2 format recorded on a DVD or the like. A series of the moving pictures consists of a plurality of GOPs (Groups of Pictures). The elements of series of GOPs are referred to as GOP#1, GOP#2, GOP#3, . . . , GOP#(N−1), and GOP#N from the first GOP in a playback order. Thus, the first picture in the GOP#1 is the first picture of the moving pictures, and the last picture in the GOP#N is the last picture of the moving pictures. A single GOP includes a plurality of (for example, 15) pictures, and playback time of the single GOP corresponds to approximately 0.5 second.

Each picture composing a single GOP is classified into one of an I(Intra-coded)-picture, a P(Predictive-coded)-picture, and a B(Bidirectionally Predictive-coded)-picture. Each GOP includes at least one I-picture. However, hereinafter it is assumed that each GOP includes only one I-picture. Picture types of the plurality of pictures composing the single GOP are arranged in a playback order of, for example, 2B, 3B, 1I, 5B, 6B, 7P, 8B, 9B, 10P, 11B, 12B, 13P, 14B, and 15B, where numerals preceding "I", "P", or "B" indicate an order in a data stream. In other words, in the data stream, each picture data is arranged in the order of 1I, 2B, 3B, 4P, 5B, 6B, 7P, 8B, 9B, 10P, 11B, 12B, 13P, 14B, and 15B.

When fast forward playback or fast reverse playback of moving pictures recorded on a DVD is performed using known DVD players, many DVD players are configured to play back only I-pictures among I-pictures, P-pictures, and B-pictures composing moving pictures (see, for example, Patent Document 1).

[Patent Document 1] Japanese Unexamined Patent Application Publication 2001-211405

DISCLOSURE OF INVENTION

Problems to be Solved by the Invention

Concerning known DVD players that play back only I-pictures during fast forward playback or fast reverse playback, there are problems that a last picture of moving pictures is not displayed when the fast forward playback reaches the end of the moving pictures, and also a first picture of the moving pictures is not displayed when the fast forward playback reaches the beginning of the moving pictures. Accordingly, there is a disadvantage of poor usability for users.

The present invention is made in view of these circumstances. Thus, it is an object of the present invention to enable a quick display of the last picture of the moving pictures during the fast forward playback and the first picture of the moving pictures during the fast reverse playback.

Means For Solving The Problems

A first image playback apparatus according to the present invention includes: buffering means for buffering moving picture data; decoding means for reading out and decoding the moving picture data buffered by the buffering means; outputting means for outputting pictures decoded by the decoding means to a subsequent stage; and controlling means for controlling the buffering means to buffer, concerning a group of picture data that is played back last during a playback operation, at least picture data located at the end in a playback order, and to buffer, concerning groups of picture data except for the group of picture data that is played back last during the playback operation, picture data encoded by a predetermined encoding method, controlling the decoding means to decode, concerning the group of picture data that is played back last during the playback operation, at least the picture data located at the end in the playback order, and to decode, concerning the groups of picture data except for the group of picture data that is played back last during the playback operation, the picture data encoded by the predetermined encoding method, and controlling the outputting means to output, concerning the group of picture data that is played back last during the playback operation, at least the picture data located at the end in the playback order, and to output, concerning the groups of picture data except for the group of picture data that is played back last during the playback operation, pictures corresponding to the picture data encoded by the predetermined encoding method.

A first image playback method according to the present invention includes the steps of: controlling buffering means to buffer, concerning a group of picture data that is played back last during a playback operation, at least picture data located at the end in a playback order, and to buffer, concerning groups of picture data except for the group of picture data that is played back last during the playback operation, picture data encoded by a predetermined encoding method; controlling decoding means to decode, concerning the group of picture data that is played back last during the playback operation, at least the picture data located at the end in the playback order, and to decode, concerning the groups of picture data except for the group of picture data that is played back last during the playback operation, the picture data encoded by the predetermined encoding method; and controlling outputting means to output, concerning the group of picture data that is played back last during the playback operation, at least the picture data located at the end in the playback order, and to output, concerning the groups of picture data except for the group of picture data that is played back last during the playback operation, pictures corresponding to the picture data encoded by the predetermined encoding method.

A first program according to the present invention allows a computer to execute a process including the steps of: controlling buffering means to buffer, concerning a group of picture data that is played back last during a playback operation, at least picture data located at the end in a playback order, and to buffer, concerning groups of picture data except for the group of picture data that is played back last during the playback operation, picture data encoded by a predetermined encoding method; controlling decoding means to decode, concerning the group of picture data that is played back last during the playback operation, at least the picture data located at the end in the playback order, and to decode, concerning the groups of picture data except for the group of picture data that is played back last during the playback operation, the picture data encoded by the predetermined encoding method; and controlling outputting means to output, concerning the group of picture data that is played back last during the playback operation, at least the picture data located at the end in the playback order, and to output, concerning the groups of picture data except for the group of picture data that is played back last during the playback operation, pictures corresponding to the picture data encoded by the predetermined encoding method.

In the first image playback apparatus and method, and program according to the present invention, the buffering means is controlled to buffer, concerning the group of picture data that is played back last during the playback operation, at least the picture data located at the end in the playback order, and to buffer, concerning the groups of picture data except for the group of picture data that is played back last during the playback, the picture data encoded by the predetermined encoding method. The decoding means is controlled to decode, concerning the group of picture data that is played back last during the playback, at least the picture data located at the end in the playback order, and to decode, concerning the groups of picture data except for the group of picture data that is played back last during the playback, the picture data encoded by the predetermined encoding method. The outputting means is controlled to output, concerning the group of picture data that is played back last during the playback, at least the picture data located at the end in the playback order, and to output, concerning the groups of picture data except for the group of picture data that is played back last during the playback, the pictures corresponding to the picture data encoded by the predetermined encoding method.

A second image playback apparatus according to the present invention includes: buffering means for buffering moving picture data; decoding means for reading out and decoding the moving picture data buffered by the buffering means; outputting means for outputting pictures decoded by the decoding means to a subsequent stage; and controlling means for, when special playback, different from normal playback, in a forward direction is instructed, controlling the buffering means to buffer, concerning a last group of picture data, all the picture data, and to buffer, concerning groups of picture data except for the last group of picture data, part of the picture data including at least picture data classified into I-pictures, controlling the decoding means to decode, concerning the last group of picture data, the picture data classified into the I-pictures or P-pictures, and to decode, concerning the groups of picture data except for the last group of picture data, at least the picture data classified into the I-pictures, and controlling the outputting means to output, concerning the last group of picture data, at least a last picture of moving pictures, and to output, concerning the groups of picture data except for the last group of picture data, at least pictures corresponding to the I-pictures, whereas when the special playback, different from the normal playback, in a reverse direction is instructed, controlling the buffering means to buffer, concerning a first group of picture data, all the picture data, and to buffer, concerning groups of picture data except for the first group of picture data, part of the picture data including at least the picture data classified into the I-pictures, controlling the decoding means to decode, concerning the first group of picture data, at least picture data corresponding to a first picture of the moving pictures, and to decode, concerning the groups of picture data except for the first group of picture data, at least the picture data classified into the I-pictures, and controlling the outputting means to output, concerning the first group of picture data, at least the first picture of moving pictures, and to output, concerning the groups of picture data except for the first group of picture data, at least pictures corresponding to the I pictures.

The controlling means may be configured to specify picture types to be decoded for each group of picture data, and notify the decoding means of the picture types to be decoded in advance, and the decoding means may be configured to read out and decode the moving picture data buffered by the buffering means according to the notification from the controlling means.

A second image playback method according to the present invention includes the steps of: when special playback, different from normal playback, in a forward direction is instructed, controlling buffering means to buffer, concerning a last group of picture data, all picture data, and to buffer, concerning groups of picture data except for the last group of picture data, part of picture data including at least picture data classified into I-pictures; controlling decoding means to decode, concerning the last group of picture data, picture data classified into the I-pictures or P-pictures, and to decode, concerning the groups of picture data except for the last group of picture data, at least the picture data classified into the I-pictures; and controlling outputting means to output, concerning the last group of picture data, at least a last picture of the moving pictures, and to output, concerning the groups of picture data except for the last group of picture data, at least pictures corresponding to the I-pictures, whereas when the special playback, different from the normal playback, in a reverse direction is instructed, controlling the buffering means to buffer, concerning a first group of picture data, all the picture data, and to buffer, concerning groups of picture data except for the first group of picture data, part of the picture data including at least the picture data classified into the I-pictures; controlling the decoding means to decode, concerning the first group of picture data, at least picture data corresponding to a first picture of the moving pictures, and to decode, concerning the groups of picture data except for the first group of picture data, at least the picture data classified into the I-pictures; and controlling the outputting means to output, concerning the first group of picture data, at least the first picture of the moving pictures, and to output, concerning the groups of picture data except for the first groups of picture data, at least the pictures corresponding to the I-pictures.

A second program according to the present invention allows a computer to execute a process including the steps of: when special playback, different from normal playback, in a forward direction is instructed, controlling buffering means to buffer, concerning a last group of picture data, all picture data, and to buffer, concerning groups of picture data except for the last group of picture data, part of picture data including at least picture data classified into I-pictures; controlling decoding means to decode, concerning the last group of picture data, the picture data classified into the I-pictures or P-pictures, and to decode, concerning the groups of picture data except for the last group of picture data, at least the picture data classified into the I-pictures; and controlling outputting means to output, concerning the last group of the picture data, at least a last picture of the moving pictures, and to output, concerning the groups of picture data except for the last group of picture data, at least pictures corresponding to the I-pictures, whereas when the special playback, different from the normal playback, in a reverse direction is instructed, controlling the buffering means to buffer, concerning a first group of picture data, all the picture data, and to buffer, concerning the groups of picture data except for the first group of picture data, part of the picture data including at least the picture data classified into the I-pictures; controlling the decoding means to decode, concerning the first group of picture data, at least picture data corresponding to a first picture of the moving pictures, and to decode, concerning the groups of picture data except for the first group of picture data, at least the picture data classified into the I-pictures; and controlling the outputting means to output, concerning the first group of picture data, at least the first picture of the moving pictures, and to output, concerning the groups of picture data except for the first group of picture data, at least the pictures corresponding to the I-pictures.

In the second image playback apparatus and method, and program according to the present invention, when special playback, different from normal playback, in the forward direction is instructed, concerning the last group of picture data, all the picture data is buffered, whereas concerning the groups of picture data except for the last group of picture data, the part of the picture data including at least the picture data classified into the I-pictures is buffered. Also, concerning the last group of picture data, the picture data classified into the I-pictures or the P-pictures is decoded, whereas concerning the groups of picture data except for the last group of picture data, at least the picture data classified into the I-pictures is decoded. Additionally, concerning the last group of the picture data, at least the last picture of the moving pictures is output, whereas concerning the groups of picture data except for the last group of picture data, at least pictures corresponding to the I-pictures are output. When the special playback, different from the normal playback, in the reverse direction is instructed, concerning the first group of picture data, all the picture data is buffered, whereas concerning the groups of picture data except for the first group of picture data, the part of the picture data including at least the picture data classified into the I-pictures is buffered. Also, concerning the first group of picture data, at least picture data corresponding to the first picture of the moving pictures is decoded, whereas concerning the groups of picture data except for the first group of picture data, at least the picture data classified into the I-pictures is decoded. Additionally, concerning the first group of picture data, at least the first picture of the moving pictures is output, whereas concerning the groups of picture data except for the first group of picture data, at least the pictures corresponding to the I-pictures are output.

Advantages

According to the present invention, a quick display of the last picture of the moving pictures during the fast forward playback as well as the first picture of the moving pictures during the fast reverse playback is enabled.

Figure 1:
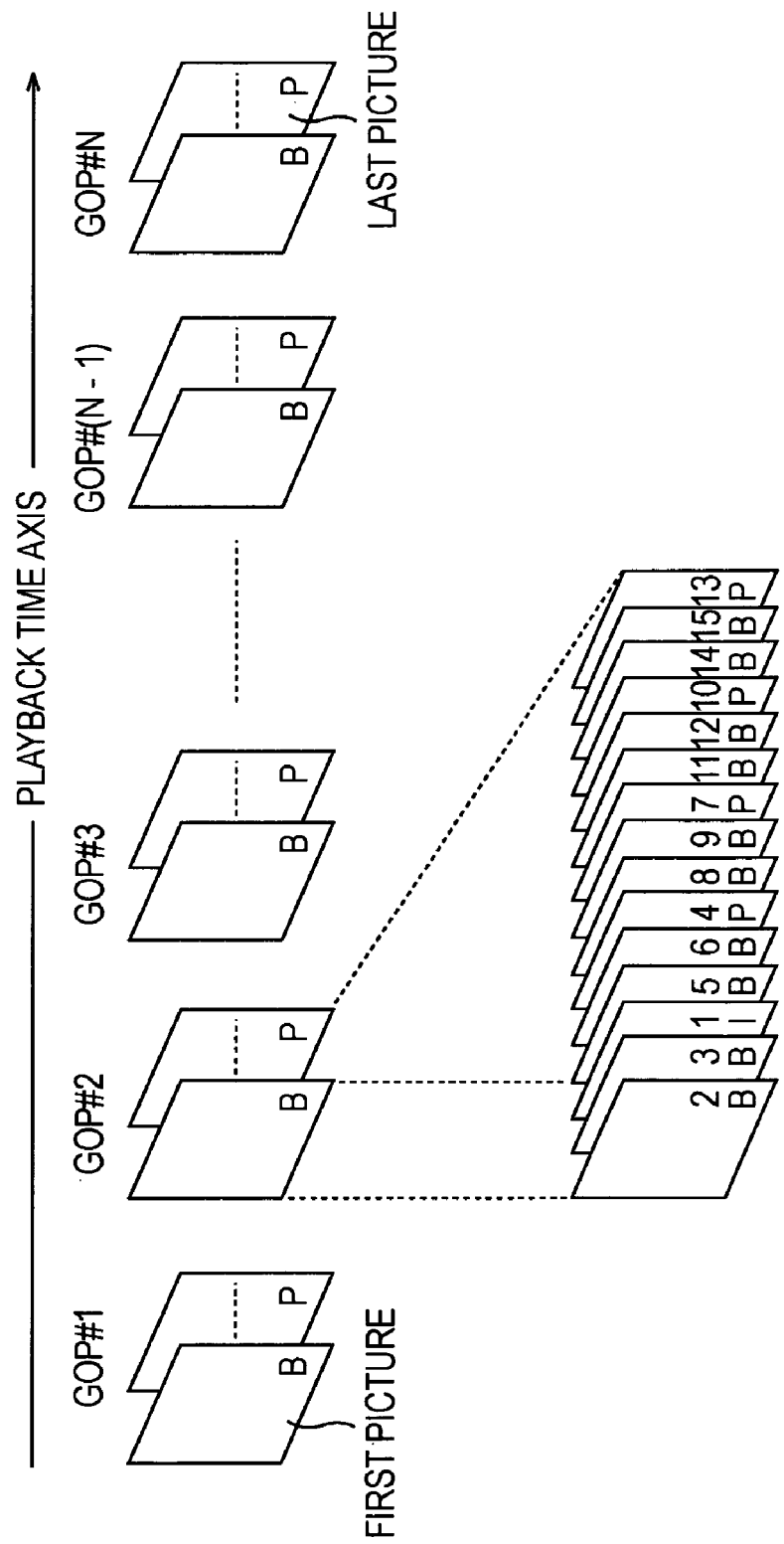
FIG. 1 shows picture types of a plurality of pictures composing moving pictures in MPEG 2 format.

REFERENCE NUMERALS 30 video player, 31 recording medium, 32 recording-medium drive, 33 stream buffer, 34 demultiplexing-decoding unit, 34-1 memory, 35 output signal processing unit, 36 controlling unit, 37 bus, 38 operation inputting unit, 39 RAM, 40 ROM, 41 input/output unit

BEST MODE FOR CARRYING OUT THE INVENTION

Exemplary embodiments to which the present invention is applied will be described in detail below with reference to the drawings.

Figure 2:
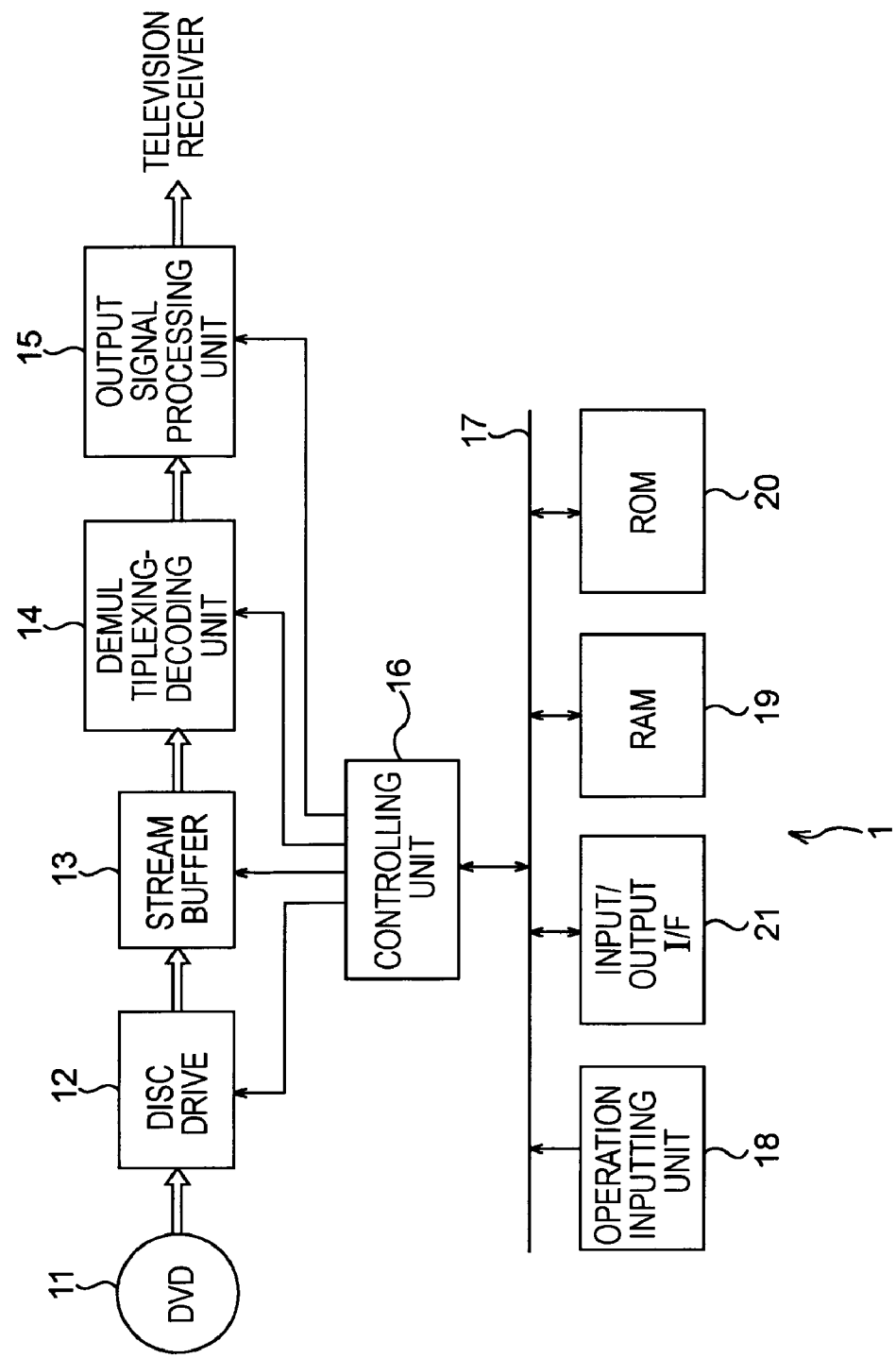
FIG. 2 is a block diagram showing an example configuration of a DVD player to which the present invention is applied.

FIG. 2 shows an example configuration of a DVD player to which the present invention is applied. This DVD player 1 is configured to display a last picture of moving pictures in fast forward playback and a first picture of the moving pictures in fast reverse playback.

The DVD player 1 includes a disc drive 12, a stream buffer 13, a demultiplexing-decoding unit 14, an output signal processing unit 15, and a controlling unit 16. The disc drive 12 reads out encoded data of the moving pictures from a DVD 11. The stream buffer 13 buffers the read out encoded data. The demultiplexing-decoding unit 14 reads out the encoded data from the stream buffer 13, separates the encoded data into encoded video data and encoded audio data, and decodes the encoded video/audio data. The output signal processing unit 15 performs a predetermined signal processing on video signals and audio signals, i.e., the decoded results, and outputs the processed signals to a subsequent stage. The controlling unit 16 controls the disc drive 12, the stream buffer 13, the demultiplexing-decoding unit 14, and the output signal processing unit 15.

Figure 3:
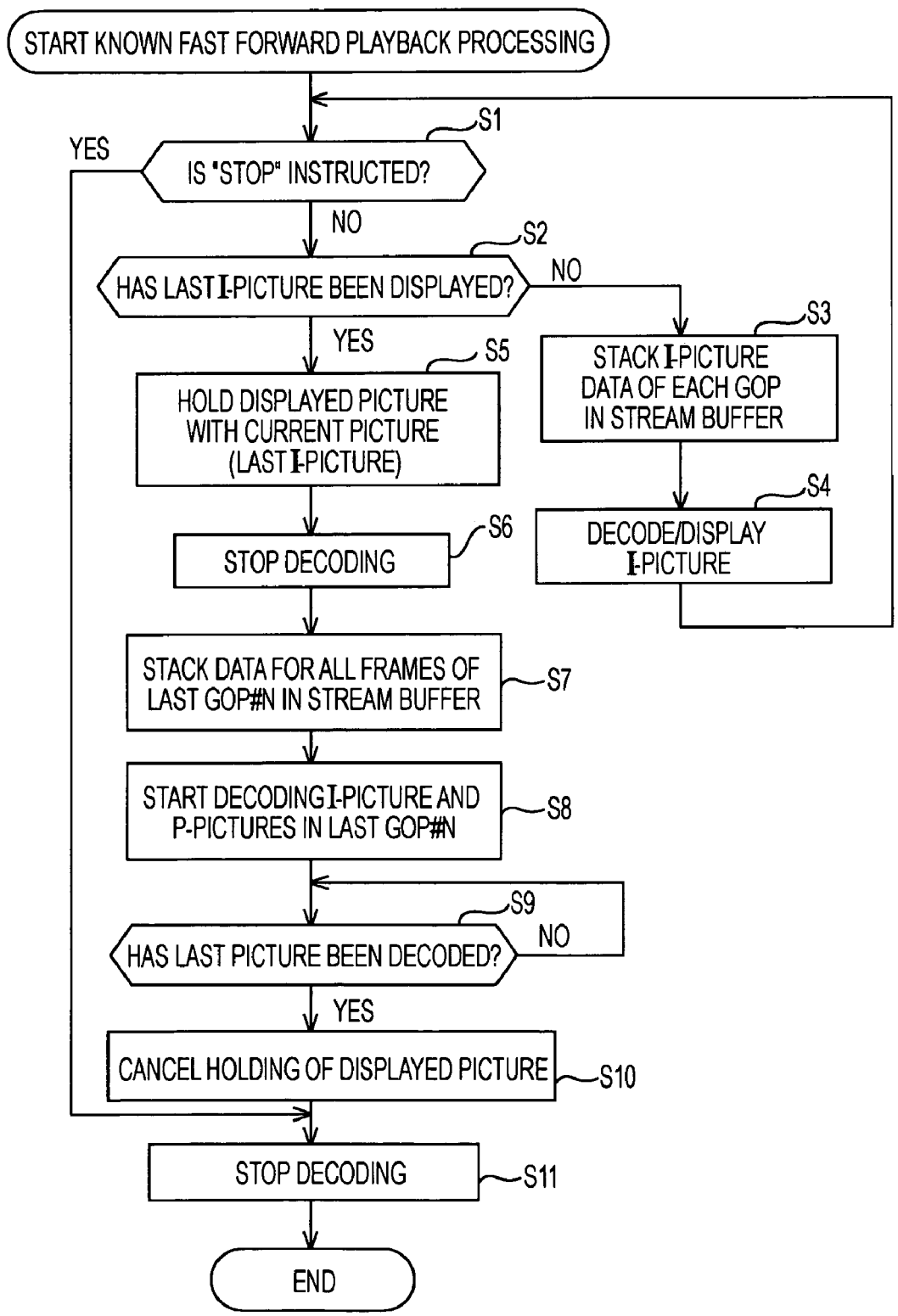
FIG. 3 is a flowchart illustrating fast forward playback processing performed by a DVD player shown in FIG. 2.

Referring to a flowchart of FIG. 3, fast forward playback processing performed by the DVD player 1 will be described. When an operation to instruct the fast forward playback is performed by a user, this fast forward playback processing starts. At STEP S1, the controlling unit 16 determines whether or not an operation to instruct finishing of the fast forward playback, such as a stop operation, is performed by a user. If the controlling unit 16 determines that the operation to instruct finishing of the fast forward playback is not performed, the process proceeds to STEP S2. At STEP S2, the controlling unit 16 monitors the demultiplexing-decoding unit 14 and the output signal processing unit 15 to determine whether or not an I-picture included in a last GOP#N has been output from the output signal processing unit 15 to the subsequent stage. If the controlling unit 16 determines that the I-picture has not been output, the process proceeds to STEP S3.

At STEP S3, under the control of controlling unit 16, the disc drive 12 and the stream buffer 13 read out only encoded data corresponding to the I-pictures arranged at the head of each data stream for the corresponding predetermined number of GOPs from the DVD 11. The read out encoded data corresponding to the I-pictures is stacked in the stream buffer 13. At STEP S4, the demultiplexing-decoding unit 16 reads out the encoded data corresponding to the I-pictures stacked in the stream buffer 13 in the stacked order, separates the encoded video data from the encoded data, decodes the separated video data, and outputs I-picture video signals resulting from the decoding to the output signal processing unit 15. Under the control of the controlling unit 16, the output signal processing unit 15 performs the predetermined signal processing on the I-picture video signals, and outputs the processed signals to a television receiver or the like at the subsequent stage.

Then, the process returns to STEP S1, thereafter the foregoing process is repeated. By repeating the foregoing process, only the I-picture in each GOP is decoded and displayed on the television receiver or the like at the subsequent stage. Meanwhile, at STEP S1, if the controlling unit 16 determines that the operation to instruct finishing of the fast forward playback, such as the stop operation, is performed by the user, the process proceeds to STEP S11.

Also, while repeating the foregoing process, at STEP S2, if the controlling unit 16 determines that the I-picture included in the last GOP#N has been output from the output signal processing unit 15 to the subsequent stage, the process proceeds to STEP S5. At STEP S5, the output signal processing unit 15 holds its output signal to the subsequent stage with the current video signal (i.e., the I-picture in the last GOP#N). This maintains a state in which the I-picture in the last GOP#N is displayed on the television receiver or the like at the subsequent stage.

Up to this point, only the I-pictures have been played back, however, hereafter the I-pictures and P-pictures are played back. When switching from playback of only the I-pictures to playback of the I-pictures and P-pictures, general decoders (in the current case, the demultiplexing-decoding unit 14) have to temporarily stop the decoding. Accordingly, at STEP S6, the demultiplexing-decoding unit 14 stops decoding the encoded data.

At STEP S7, under the control of the controlling unit 16, the disc drive 12 and the stream buffer 13 read out the encoded data for all frames in the last GOP#N from the DVD 11. The read out encoded data for all the frames in the last GOP#N is stacked in the stream buffer 13. At STEP S8, the demultiplexing-decoding unit 14 reads out the encoded data for all the frames in the last GOP#N stacked in the stream buffer 13, separates the encoded video data for I-picture and P-pictures included the encoded data, decodes the separated video data, and outputs the video signals for the I-pictures and P-pictures resulting from the decoding to the output signal processing unit 15.

At STEP S9, the controlling unit 36 monitors the demultiplexing-decoding unit 14 to determine whether or not the demultiplexing-decoding unit 14 has decoded the last picture of the moving pictures, and stands by until determining that the last picture has been decoded. When the controller unit 16 determines that the last picture has been decoded, the process proceeds to STEP S10. At STEP S10, the output signal processing unit 15 cancels the holding of its output signal to the subsequent stage under the control of the controlling unit 16. This causes the last picture to be displayed on the television receiver or the like at the subsequent stage. At STEP S11, the demultiplexing-decoding unit 14 stops decoding the encoded data. Accordingly, the fast forward playback processing is finished.

Figure 4:
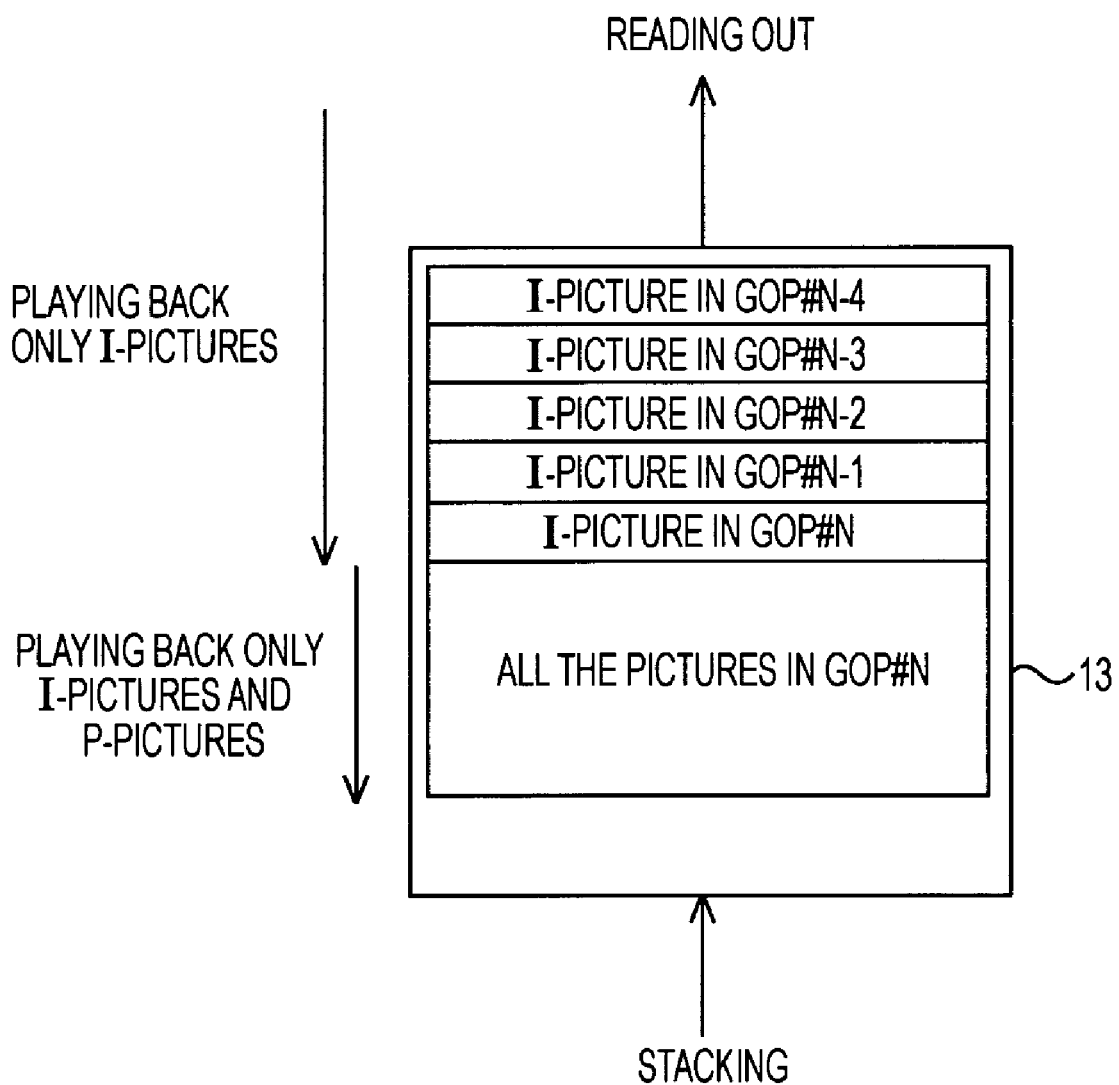
FIG. 4 shows stacking and reading of data in and out of a stream buffer shown in FIG. 2.

As described above, when the fast forward playback is performed in the DVD player 1, it is possible to display the last picture of the last GOP#N. However, as shown in FIG. 4, the encoded video data of the I-pictures in the GOPs from the GOP at which the fast forward playback is started to the last GOP#N is stacked in the stream buffer 13, and is read out and decoded. Then, the encoded video data for all the frames in the last GOP#N is stacked, and the I-picture and the P-pictures are decoded. Thus, since the encoded video data of the I-picture in the last GOP#N is stacked in the stream buffer 13 twice, display of the last picture is delayed by a time period required for superfluous stacking. This prevents a smooth screen switching when the fast forward playback is performed.

Likewise, when fast reverse playback is performed, it is possible to display the first picture of the first GOP#1. However, a delay occurs between the display of the picture immediately prior to the first picture and the display of the first picture. This also prevents the smooth screen switching when the fast reverse playback is performed.

Now, an example configuration that can implement smooth screen switching during fast forward playback and fast reverse playback will be described.

Figure 5:
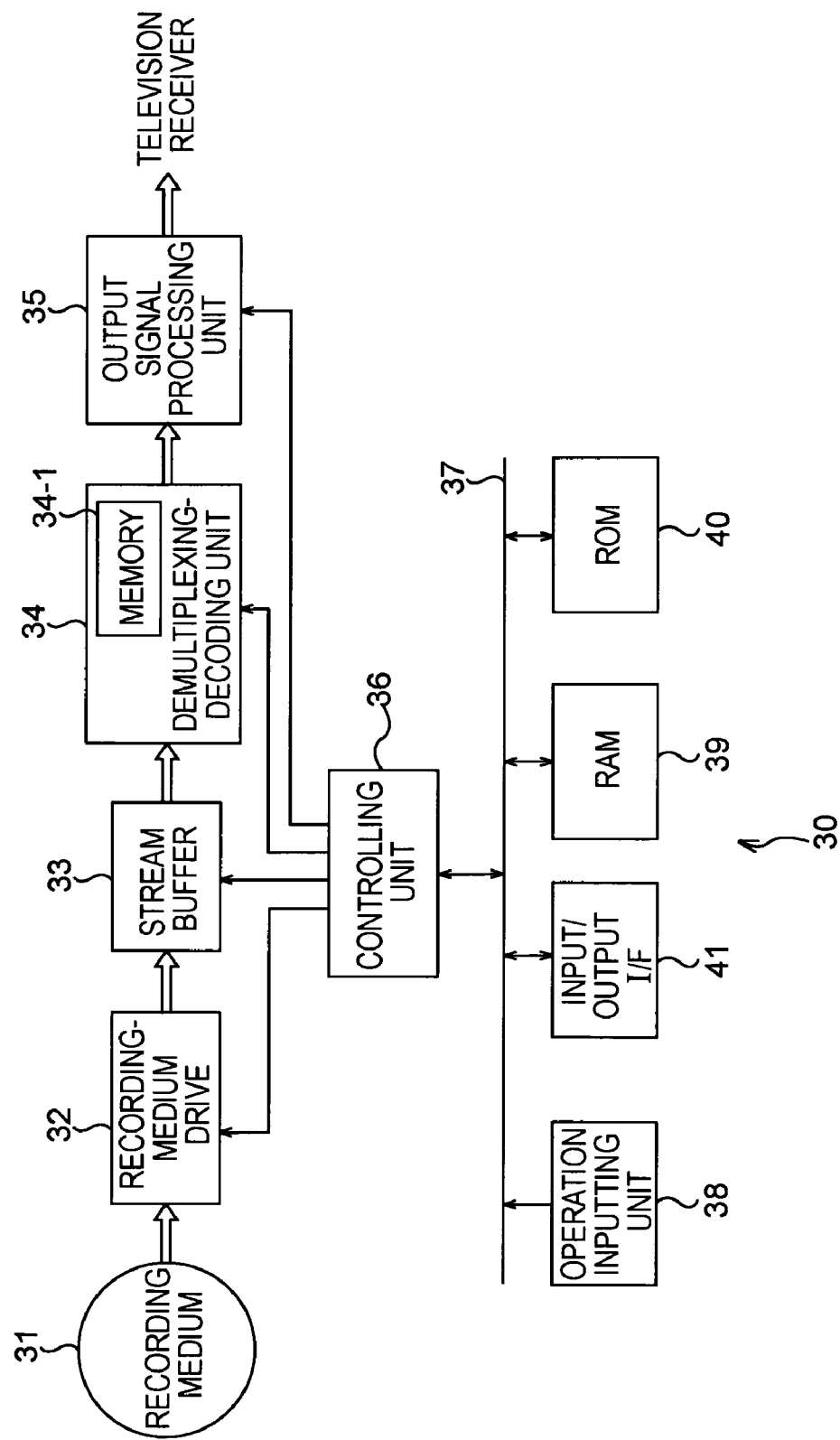
FIG. 5 is a block diagram showing an example configuration of a video player to which the present invention is applied.

FIG. 5 shows an example configuration of a video player to which the present invention is applied. This video player 30 plays back moving pictures (e.g., encoded data that is encoded according to the MPEG2 format or the like) recorded on a recording medium 31, such as an optical disc (including a CD-ROM (Compact Disc-Read Only Memory) disc, a DVD, and a Blu-ray Disc), a magneto-optical disc (including an MD (Mini Disc)), or a semiconductor memory. The video player 30 is capable of performing not only normal playback but also special playback, such as fast forward playback and fast reverse playback.

The video player 30 includes a recording-medium drive 32, a stream buffer 33, a demultiplexing-decoding unit 34, an output signal processing unit 35, and a controlling unit 36. The recording-medium drive 32 reads out encoded data of the moving pictures from the recording medium 31. The stream buffer 33 buffers the read out encoded data. The demultiplexing-decoding unit 34 reads out the encoded data from the stream buffer 33, separates encoded video data and encoded audio data from the encoded data, and decodes the encoded video and audio data. The output signal processing unit 35 performs predetermined signal processing on video signals and audio signals resulting from the decoding, and outputs the processed signals to a subsequent stage. The controlling unit 36 controls the recording-medium drive 32, the stream buffer 33, the demultiplexing-decoding unit 34, and the output signal processing unit 55.

The demultiplexing-decoding unit 34 has a full frame decoding mode for decoding I-, P-, and B-pictures composing the moving pictures, an I-picture decoding mode for decoding only the I-pictures, and an I/P-picture decoding mode for decoding the I- and P-pictures. Also, by keeping the decoding modes for each GOP that are specified by the controlling unit 36 beforehand in an internal memory 34-1 and making reference thereto, the demultiplexing-decoding unit 34 can shift among the decoding modes without stopping the decoding processing.

The controlling unit 36 includes a CPU (Central Processing Unit) or the like, and is connected to an operation inputting unit 38, a RAM 39, a ROM 40, and an input/output interface (I/F) 41 through a bus 37.

The operation inputting unit 38 receives user's operations, and outputs operation signals corresponding to the user's operations to the controlling unit 36 through the bus 37. The RAM 39 includes an SRAM, a DRAM, or the like, and is used as a working area for the controlling unit 36. The ROM 40 includes a flash memory such as an EEPROM, and keeps control programs executed by the controlling unit 36 therein. The input/output interface interface 41 communicates predetermined data (for example, data for updating the control programs kept in the ROM 40, etc.) with external apparatuses not shown.

Figure 6:
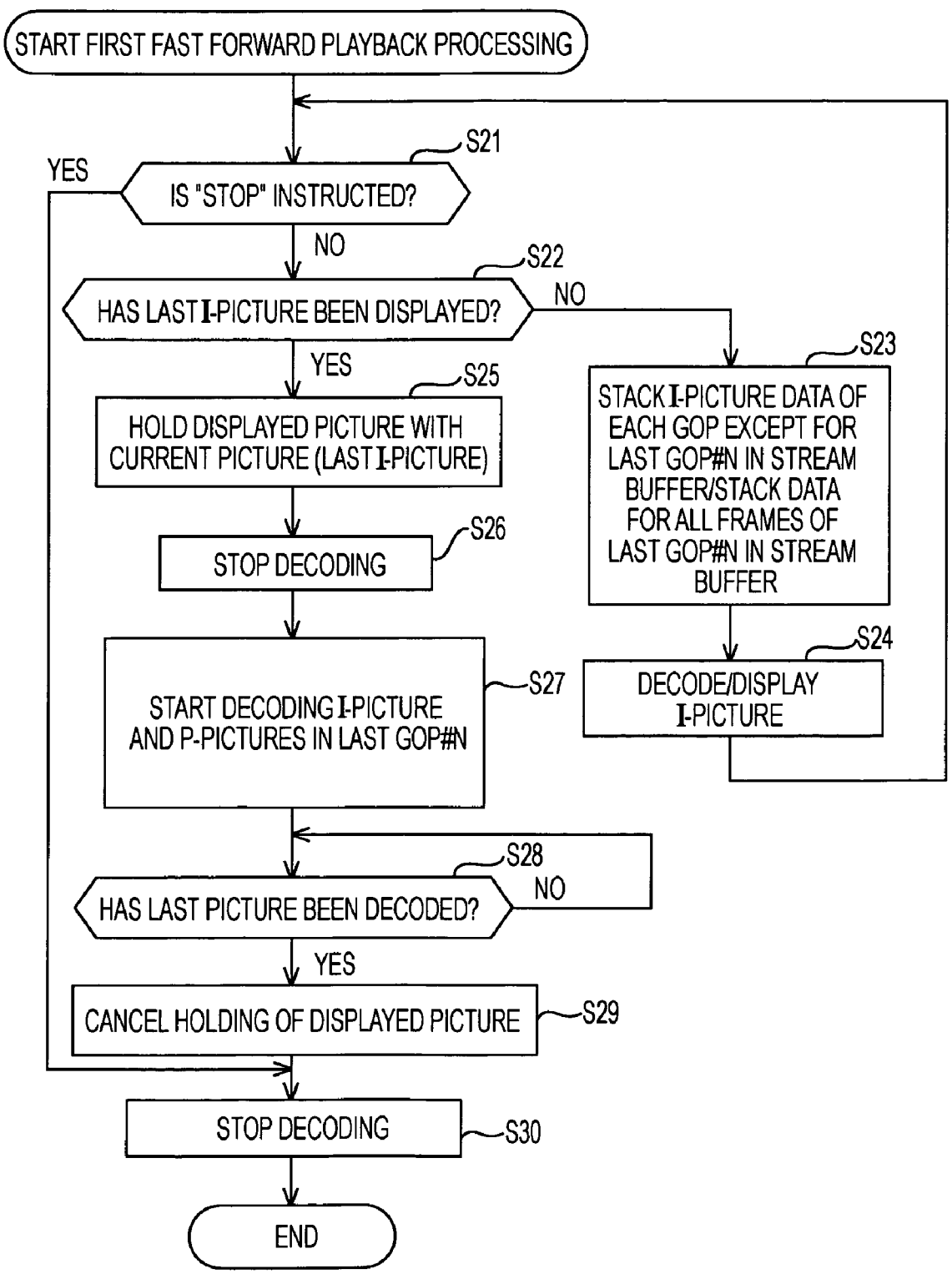
FIG. 6 is a flowchart illustrating first fast forward playback processing performed by a video player shown in FIG. 5.

Referring to a flowchart of FIG. 6, first fast forward playback processing performed by the video player 30 will be described next. When an operation to instruct the fast forward playback is received from a user by the operation inputting unit 38, and the operation signal corresponding to the user's operation is supplied to the controlling unit 36 through the bus 37, this fast forward playback processing starts.

At STEP S21, the controlling unit 36 determines whether or not an operation to instruct finishing of the fast forward playback, such as a stop operation, is performed by the user on the basis of the presence or absence of the operation signal from the operation inputting unit 38. If the controlling unit 36 determines that the operation to instruct finishing of the fast forward playback is not performed, the process proceeds to STEP S22. At STEP S22, the controlling unit 36 monitors the demultiplexing-decoding unit 34 and the output signal processing unit 35 to determine whether or not an I-picture included in the last GOP#N has been output from the output signal processing unit 15 to a television receiver or the like at the subsequent stage to be displayed. If the controlling unit 36 determines that the I-picture is not displayed, the process proceeds to STEP S23.

At STEP S23, under the control of the controlling unit 36, the recording-medium drive 32 reads out the encoded data corresponding to the I-pictures arranged at the head of each data stream for the corresponding predetermined number of GOPs from the recording medium 31 in a playback order. The read out encoded data corresponding to the I-pictures is stacked in the stream buffer 33. However, concerning the last GOP#N, the encoded data for all frames is read out and stacked in the stream buffer 33.

At STEP S24, the controlling unit 36 notifies the demultiplexing-decoding unit 34 to operate in the I-picture decoding mode. Under the control of the controlling unit 36, the demultiplexing-decoding unit 34 reads out the encoded data corresponding to the I-pictures stacked in the stream buffer 33 in the stacked order, separates the encoded video data from the encoded data, decodes the separated encoded video data, and outputs I-picture video signals resulting from the decoding to the output signal processing unit 35. Under the control of the controlling unit 36, the output signal processing unit 35 performs the predetermined signal processing on the I-picture video signals, and outputs the processed signals to the television receiver or the like at the subsequent stage.

Then, the process returns to STEP S21, thereafter the foregoing process is repeated. By repeating the foregoing process, only the I-picture in each GOP is decoded and displayed on the television receiver or the like at the subsequent stage. Meanwhile, at STEP S21, if the controlling unit 36 determines that the operation to instruct finishing of the fast forward playback, such as the stop operation, is performed by the user, the process proceeds to STEP S30.

Also, while repeating the foregoing process, at STEP S22, if the controlling unit 36 determines that the I-picture included in the last GOP#N has been output from the output signal processing unit 35 to the television receiver or the like at the subsequent stage to be displayed, the process proceeds to STEP S25.

At STEP S25, the output signal processing unit 35 holds its output signal to the subsequent stage with the current video signal (i.e., the I-picture in the last GOP#N). This maintains a state in which the I-picture in the last GOP#N is displayed on the television receiver or the like at the subsequent stage.

Up to this point, the demultiplexing-decoding unit 34 has operated in the I-picture decoding mode, however, hereafter the demultiplexing-decoding unit 34 shifts to the I/P-picture decoding mode. As described above, when shifting from the I-picture decoding mode to the I/P-picture decoding mode, the demultiplexing-decoding unit 34 does not have to stop the decoding processing if the decoding modes for each GOP have been directed in advance. However, in the current case, since the direction of the decoding modes for each GOP has not been made, the multiplexing-decoding unit 34 has to temporarily stop the decoding. Accordingly, at STEP S26, the demultiplexing-decoding unit 34 stops decoding the encoded data under the control of the controlling unit 36.

At STEP S27, the controlling unit 36 notifies the demultiplexing-decoding unit 34 to operate in the I/P-picture decoding mode. The demultiplexing-decoding unit 34 reads out the encoded data for all the frames in the last GOP#N stacked in the stream buffer 33, separates the encoded video data for the I-picture and P-pictures included the encoded data, decodes the separated video data, and outputs the video signals for the I-pictures and P-pictures resulting from the decoding to the output signal processing unit 35.

At STEP S28, the controlling unit 36 monitors the demultiplexing-decoding unit 34 to determine whether or not the last picture of the moving pictures has been decoded, and stands by until determining that the last picture has been decoded. When the controlling unit 36 determines that the last picture has been decoded, the process proceeds to STEP S29. At STEP S29, the output signal processing unit 35 cancels the holding of its output signal to the subsequent stage under the control of the controlling unit 36. This causes the last picture to be displayed on the television receiver or the like at the subsequent stage. At STEP S30, the demultiplexing-decoding unit 34 stops decoding the encoded data. Accordingly, the first fast forward playback processing is finished.

Figure 7:
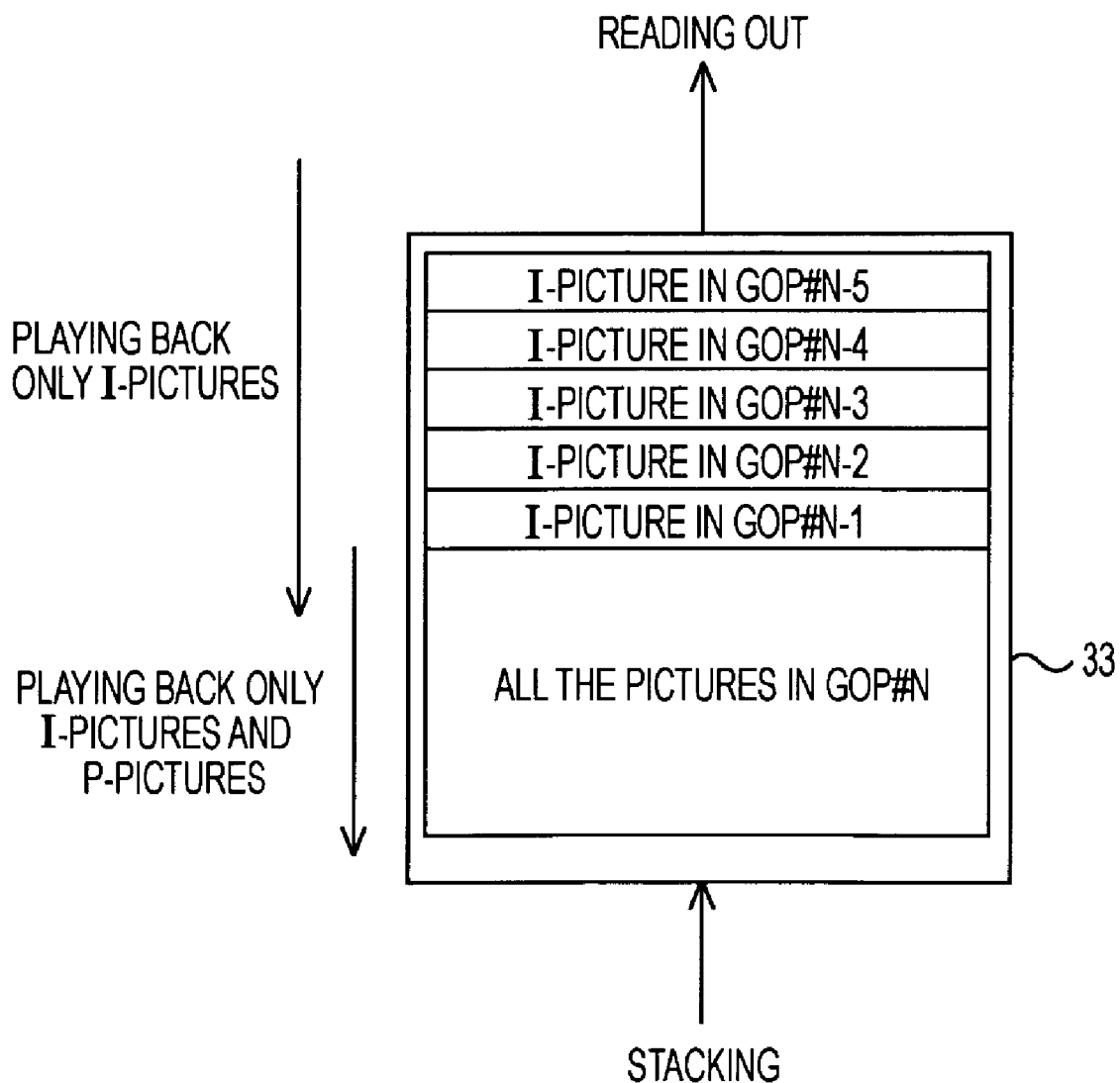
FIG. 7 shows stacking and reading of data in and out of a stream buffer shown in FIG. 5 during first fast forward playback processing.

According to the first fast forward playback processing described above, as shown in FIG. 7, concerning the GOPs from the GOP at which the fast forward playback is started to the GOP#(N−1) that is immediately prior to the last GOP#N, the encoded video data of the I-pictures is stacked in the stream buffer 33. Also, concerning the last GOP#N, the encoded video data for all the frames is stacked in the stream buffer 33. Thus, compared with a known DVD player 1, since the I-picture in the last GOP#N is not read out and stacked in the stream buffer 33 twice, a time period required for the display of the last picture can be shortened by a time period necessary for the superfluous stacking.

Figure 8:
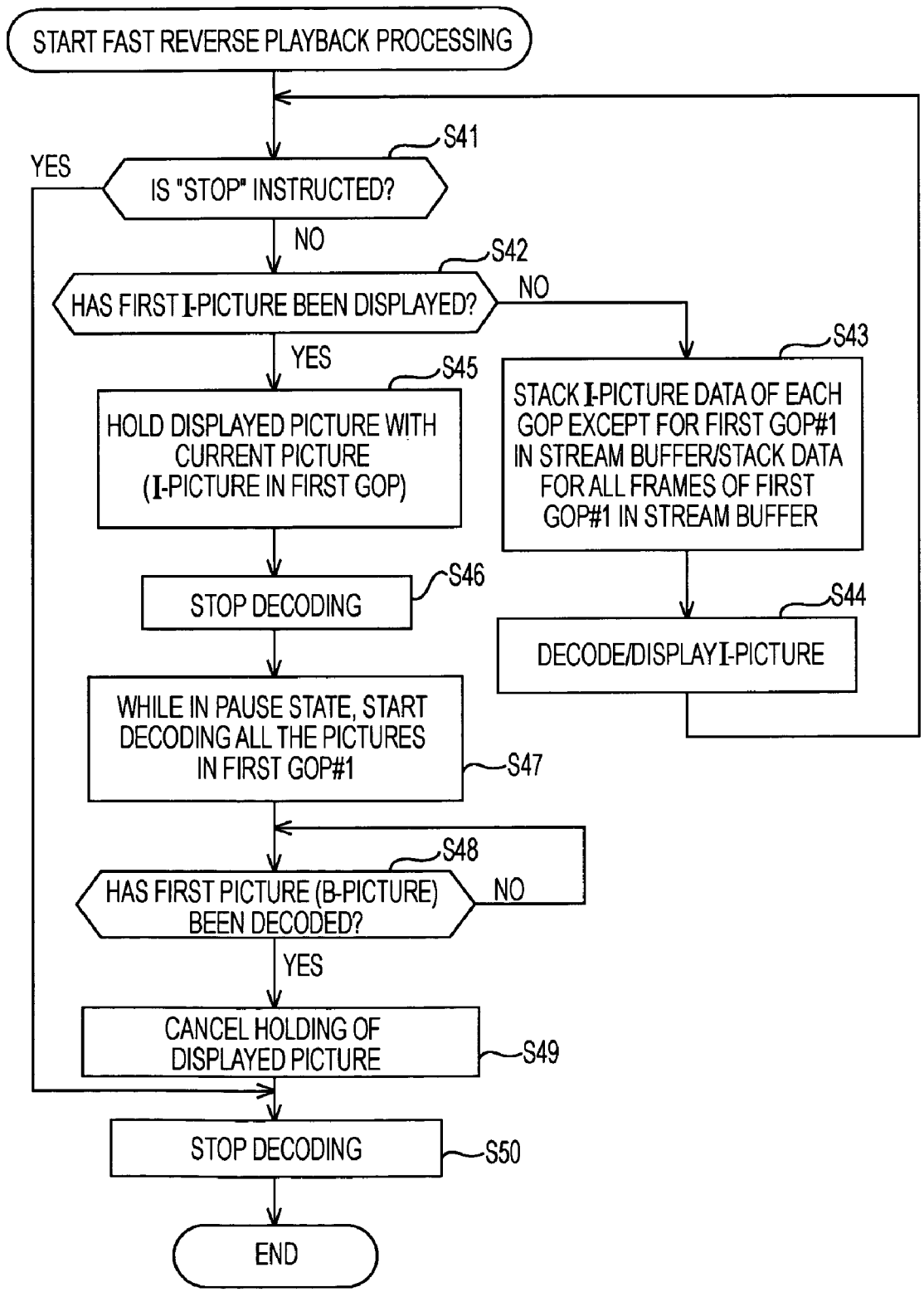
FIG. 8 is a flowchart illustrating fast reverse playback processing performed by a video player shown in FIG. 5.

Referring to a flowchart of FIG. 8, fast reverse playback processing performed by the video player 30 will be described next. When an operation to instruct the fast reverse playback is received from the user by the operation inputting unit 38, and the operation signal corresponding to the user's operation is supplied to the controlling unit 36 through the bus 37, this fast reverse playback processing starts.

At STEP S41, the controlling unit 36 determines whether or not an operation to instruct finishing of the fast reverse playback, such as a stop operation, is performed by the user on the basis of the presence or absence of the operation signal from the operation inputting unit 38. If the controlling unit 36 determines that the operation to instruct finishing of the fast reverse playback is not performed, the process proceeds to STEP S42. At STEP S42, the controlling unit 36 monitors the demultiplexing-decoding unit 34 and the output signal processing unit 35 to determine whether or not the I-picture included in the first GOP#1 has been output from the output signal processing unit 15 to the television receiver or the like at the subsequent stage to be displayed. If the controlling unit 36 determines that the I-picture is not displayed, the process proceeds to STEP S43.

At STEP S43, under the control of the controlling unit 36, the recording-medium drive 32 reads out the encoded data corresponding to the I-pictures arranged at the head of each data stream for the corresponding predetermined number of the GOPs from the recording medium 31 in an order of the fast reverse playback. The read out encoded data corresponding to the I-pictures is stacked in the stream buffer 33. However, concerning the first GOP#1, the encoded data for all frames is read out and stacked in the stream buffer 33.

At STEP S44, the controlling unit 36 notifies the demultiplexing-decoding unit 34 to operate in the I-picture decoding mode. Under the control of the controlling unit 36, the demultiplexing-decoding unit 34 reads out the encoded data corresponding to the I-pictures stacked in the stream buffer 33 in the stacked order, separates the encoded video data, decodes the separated video data, and outputs the I-picture video signals resulting from the decoding to the output signal processing unit 35. Under the control of the controlling unit 36, the output signal processing unit 35 performs the predetermined signal processing on the I-picture video signals, and outputs the processed signals to the television receiver or the like at the subsequent stage.

Then, the process returns to STEP S41, thereafter the foregoing process is repeated. By repeating the foregoing process, only the I-picture in each GOP is decoded and displayed on the television receiver or the like at the subsequent stage. Meanwhile, at STEP S41, if the controlling unit 36 determines that the operation to instruct finishing of the fast reverse playback, such as the stop operation, is performed by the user, the process proceeds to STEP S50.

Also, while repeating the foregoing process, at STEP S42, if the controlling unit 36 determines that the I-picture included in the first GOP#1 has been output from the output signal processing unit 35 to the television receiver or the like at the subsequent stage to be displayed, the process proceeds to STEP S45.

At STEP S45, the output signal processing unit 35 holds its output signal to the subsequent stage with the current video signal (i.e., the I-picture in the first GOP#1). This maintains a state in which the I-picture in the last GOP#N is displayed on the television receiver or the like at the subsequent stage.

Up to this point, the demultiplexing-decoding unit 34 has operated in the I-picture decoding mode, however, hereafter the demultiplexing-decoding unit 34 shifts to the full frame decoding mode. As described above, when shifting from the I-picture decoding mode to the full frame decoding mode, the demultiplexing-decoding unit 34 does not have to stop the decoding processing if the decoding modes for each GOP have been directed in advance. However, in the current case, since the direction of the decoding modes for each GOP has not been made, the multiplexing-decoding unit 34 has to temporarily stop the decoding. Accordingly, at STEP S46, the multiplexing-decoding unit 34 stops decoding the encoded data under the control of the controlling unit 36.

At STEP S47, after putting the demultiplexing-decoding unit 34 in a pause state (i.e., a state in which the demultiplexing-decoding unit 34 is instructed to stand by after decoding only a first frame), the controlling unit 36 notifies the demultiplexing-decoding unit 34 to operate in the full frame decoding mode. The demultiplexing-decoding unit 34 reads out the encoded data for all the frames in the first GOP#1 stacked in the stream buffer 33, starts decoding the first picture, and outputs the video signal of the first picture (in current case, the B-picture) resulting from the decoding to the output signal processing unit 35.

At STEP S48, the controlling unit 36 monitors the demultiplexing-decoding unit 34 to determine whether or not the first picture of the moving pictures has been decoded, and stands by until determining that the first picture has been decoded. When the controlling unit 36 determines that the first picture has been decoded, the process proceeds to STEP S49. At STEP S49, the output signal processing unit 35 cancels the holding of its output signal to the subsequent stage under the control of the controlling unit 36. This causes the first picture to be displayed on the television receiver or the like at the subsequent stage. At STEP S50, the demultiplexing-decoding unit 34 stops decoding the encoded data. Accordingly, the fast reverse playback processing is finished.

Figure 9:
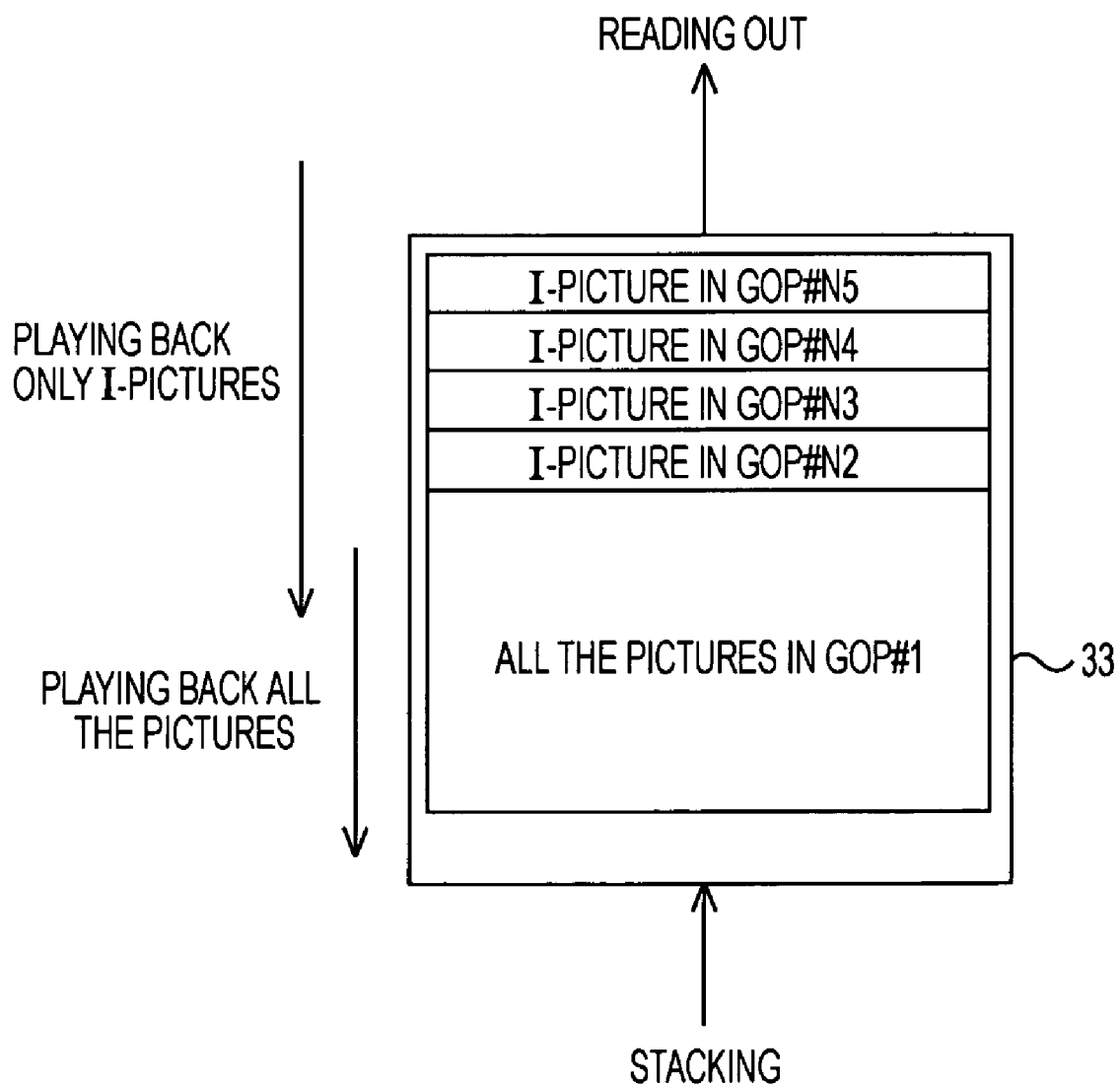
FIG. 9 shows stacking and reading of data in and out of a stream buffer shown in FIG. 5 during fast reverse playback processing.

According to the fast reverse playback processing described above, as shown in FIG. 9, concerning the GOPs from the GOP at which the fast reverse playback is started to the second GOP#2, the encoded video data of the I-pictures is stacked in the stream buffer 33. Also, concerning the first GOP#1, the encoded video data for all the frames is stacked in the stream buffer 33. Thus, compared with a known DVD player 1, since the I-picture in the first GOP#1 is not read out and stacked in the stream buffer 33 twice, a time period required for the display of the first picture can be shortened by a time period necessary for the superfluous stacking.

Figure 10:
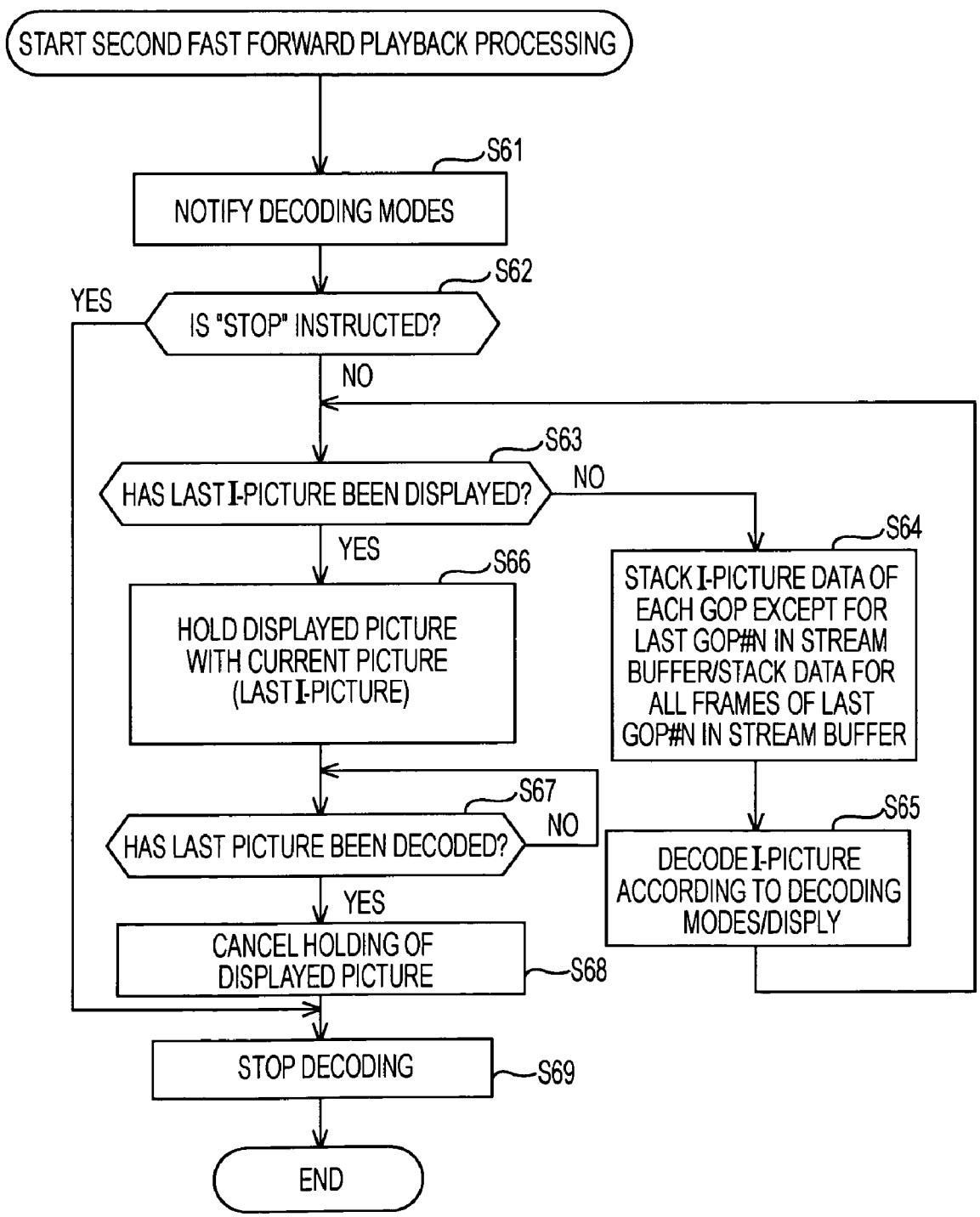
FIG. 10 is a flowchart illustrating second fast forward playback processing performed by a video player shown in FIG. 5.

Referring to a flowchart of FIG. 10, second fast forward playback processing performed by the video player 30 will be described next. When an operation to instruct the fast forward playback is received from a user by the operation inputting unit 38, and an operation signal corresponding to the user's operation is supplied to the controlling unit 36 through the bus 37, this fast forward playback processing starts.

At STEP S61, the controlling unit 36 notifies the demultiplexing-decoding unit 34 to operate in the I-picture decoding mode concerning the GOPs to the GOP#(N−1) and the I/P-picture decoding mode concerning the last GOP#N. The demultiplexing-decoding unit 34 stores this notification in the internal memory 34-1.

At STEP S62, the controlling unit 36 determines whether or not the operation to instruct finishing of the fast forward playback, such as the stop operation, is performed by the user on the basis of the presence or absence of the operation signal from the operation inputting unit 38. If the controlling unit 36 determines that the operation to instruct finishing of the fast forward playback is not performed, the process proceeds to STEP S63. At STEP S63, the controlling unit 36 monitors the demultiplexing-decoding unit 34 and the output signal processing unit 35 to determine whether or not the I-picture included in the last GOP#N has been output from the output signal processing unit 15 to the television receiver or the like at the subsequent stage to be displayed. If the controlling unit 36 determines that the I-picture is not displayed, the process proceeds to STEP S64.

At STEP S64, under the control of the controlling unit 36, the recording-medium drive 32 reads out the encoded data corresponding to the I-pictures arranged at the head of each data stream for the corresponding predetermined number of GOPs from the recording medium 31 in the playback order. The read out encoded data corresponding to the I-pictures is stacked in the stream buffer 33. However, concerning the last GOP#N, the encoded data for all frames is read out and stacked in the stream buffer 33.

At STEP S65, the demultiplexing-decoding unit 34 reads out the encoded data stacked in the stream buffer 33 in the stacked order, decodes the encoded data according to the decoding modes stored in the memory 34-1, and outputs the video signals resulting from the decoding to the output signal processing unit 35. Under the control of the controlling unit 36, the output signal processing unit 35 performs the predetermined signal processing on the video signals, and outputs the processed signals to the television receiver or the like at the subsequent stage.

Then, the process returns to STEP S62, thereafter the foregoing process is repeated. By repeating the foregoing process, only the I-pictures in the GOPs to the GOP#(N−1) are decoded and displayed on the television receiver or the like at the subsequent stage. The I-picture in the GOP#N is also decoded and displayed on the television receiver or the like at the subsequent stage. Meanwhile, at STEP S62, the controlling unit 36 determines that the operation to instruct finishing of the fast forward playback, such as the stop operation, is performed by the user, the process proceeds to STEP S69.

Also, while repeating the foregoing process, at STEP S63, if the controlling unit 36 determines that the I-picture in the last GOP#N has been output from the output signal processing unit 35 to the television receiver or the like at the subsequent stage to be displayed, the process proceeds to STEP S66.

At STEP S66, the output signal processing unit 35 holds its output signal to the subsequent stage with the current video signal (i.e., the I-picture in the last GOP#N). This maintains a state in which the I-picture in the last GOP#N is displayed on the television receiver or the like at the subsequent stage.

Although the output signal processing unit 35 holds its output signal, the demultiplexing-decoding unit 34 continues decoding the I-picture and P-pictures in the GOP#N.

At STEP S67, the controlling unit 36 monitors the demultiplexing-decoding unit 34 to determine whether or not the last picture of the moving pictures has been decoded, and stands by until determining that the last picture has been decoded. When the controlling unit 36 determines that the last picture has been decoded, the process proceeds to STEP S68. At STEP S68, the output signal processing unit 35 cancels the holding of its output signal to the subsequent stage under the control of the controlling unit 36. This causes the last picture to be displayed on the television receiver or the like at the subsequent stage. At STEP S69, the demultiplexing-decoding unit 34 stops decoding the encoded data. Accordingly, the second fast forward playback processing is finished.

Figure 11:
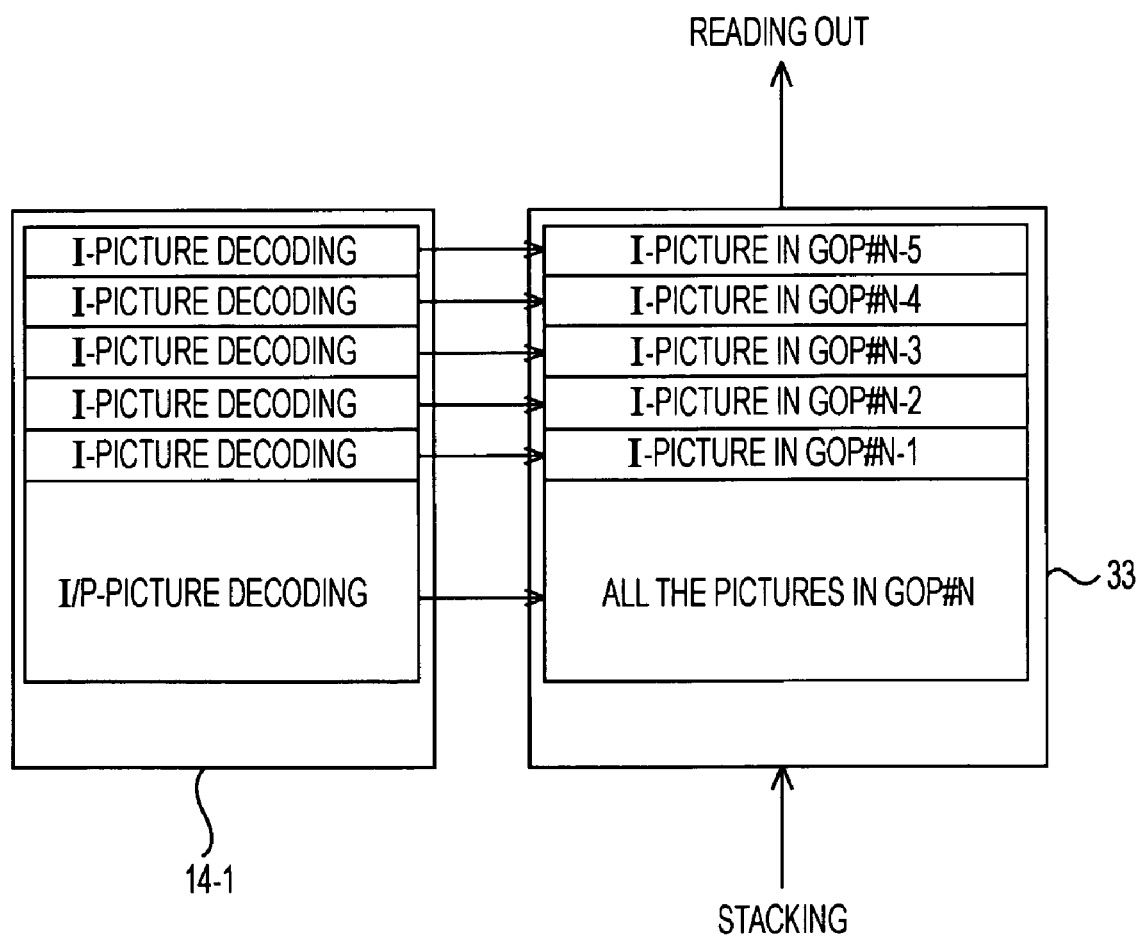
FIG. 11 shows stacking and reading of data in and out of a stream buffer shown in FIG. 5 during second fast forward playback processing.

According to the second fast forward playback processing described above, as shown in FIG. 11, concerning the GOPs from the GOP at which the fast forward playback is started to the GOP#(N−1) that is immediately prior to the last GOP#N, the encoded video data of the I-pictures is stacked in the stream buffer 33. Also, concerning the last GOP#N, the encoded video data for all the frames is stacked in the stream buffer 33. Accordingly, the I-picture in the last GOP#N is not read out and stacked twice, and the encoded data for the last GOP#N is decoded only once. Also, the demultiplexing-decoding unit 34 can shift among the decoding modes without stopping the decoding. Thus, compared with the first fast forward playback processing, a time period required for the display of the last picture can be shortened by a time period necessary for performing the aforementioned processing.

The fast forward playback processing and the fast reverse playback processing described above can be applied, for example, when moving pictures are played back at a speed slower than the normal playback speed or when the moving pictures are played back at the normal playback speed with some frames skipped.

The present invention can be applied to not only playback-only apparatuses such as DVD players but also recording-playback apparatuses such as DVD recorders, Blu-ray discs, and hard disk recorders.

Furthermore, the series of processing described above can be executed by hardware or software. When the series of processing is executed by software, programs constituting the software are installed to a computer built in dedicated hardware or, for example, a general-purpose personal computer or the like, capable of executing various functions by installing various programs, and are executed.

In this specification, the steps executed on the basis of a program include processing that is executed sequentially in the described order, and also include processing that is executed in parallel or individually, not necessarily sequentially.

Moreover, a signal computer may process the program, or distribution processing may be executed on the program by using a plurality of computers. Furthermore, the program may be transferred to a remote computer and be executed.

The invention claimed is:

1. An image playback apparatus that plays back moving picture data composed of a series of groups of picture data, each group comprising a plurality of encoded pictures, the image playback apparatus comprising:
   a buffer unit for buffering the moving picture data;
   a decoder for reading out and decoding the moving picture data buffered by the buffer unit;
   an output unit for outputting pictures decoded by the decoder to a subsequent stage; and
   a control unit configured for:
      controlling the buffer unit, concerning a group of picture data that is played back last during a playback operation, to buffer all of the pictures in the group in a playback order, and, concerning groups of picture data except for the group of picture data that is played back last during the playback operation, to buffer fewer than all of the pictures in the groups, according to a predetermined encoding method,
      controlling the decoder, concerning the group of picture data that is played back last during the playback operation, to decode all of the pictures in the group in the playback order, and, concerning the groups of picture data except for the group of picture data that is played back last during the playback operation, to decode fewer than all of the pictures in the groups, according to the predetermined encoding method, and
      controlling the output unit, concerning the group of picture data that is played back last during the playback operation, to output all of the pictures in the group in the playback order, and concerning the groups of picture data except for the group of picture data that is played back last during the playback operation, to output fewer than all of the pictures in the groups, according to the predetermined encoding method.

2. An image playback method for controlling an image playback apparatus having a decoder, an output unit, and a buffer unit for buffering moving picture data composed of a series of groups of picture data, each group comprising a plurality of encoded pictures, the image playback method comprising the steps of:

controlling the buffer unit, concerning a group of picture data that is played back last during a playback operation, to buffer all of the pictures in the group in a playback order, and, concerning groups of picture data except for the group of picture data that is played back last during the playback operation, to buffer fewer than all of the pictures in the groups, according to a predetermined encoding method;

controlling the decoder, concerning the group of picture data that is played back last during the playback operation, to decode all of the pictures in the group in the playback order, and concerning the groups of picture data except for the group of picture data that is played back last during the playback operation, to decode fewer than all of the pictures in the groups, according to the predetermined encoding method; and controlling the output unit, concerning the group of picture data that is played back last during the playback operation, to output all of the pictures in the group in the playback order, and, concerning the groups of picture data except for the group of picture data that is played back last during the playback operation, to output fewer than all of the pictures in the groups, according to the predetermined encoding method.

3. A non-transitory computer-readable storage medium storing a program for controlling an image playback apparatus having a decoder, an output unit, and a buffer unit for buffering moving picture data composed of a series of groups of picture data, each group comprising a plurality of encoded pictures, the program including instructions for a computer to execute a process comprising the steps of:

controlling the buffer unit, concerning a group of picture data that is played back last during a playback operation, to buffer all of the pictures in the group in a playback order, and, concerning groups of picture data except for the group of picture data that is played back last during the playback operation, to buffer fewer than all of the pictures in the groups, according to a predetermined encoding method;

controlling the decoder, concerning the group of picture data that is played back last during the playback operation, to decode all of the pictures in the group in the playback order, and, concerning the groups of picture data except for the group of picture data that is played back last during the playback operation, to decode fewer than all of the pictures in the groups, according to the predetermined encoding method; and controlling the output unit, concerning the group of picture data that is played back last during the playback operation, to output all of the pictures in the group in the playback order, and, concerning the groups of picture data except for the group of picture data that is played back last during the playback operation, to output fewer than all of the pictures in the groups, according to the predetermined encoding method.

4. An image playback apparatus that plays back moving picture data composed of a series of groups of picture data, each group comprising a plurality of pictures, each of which is classified into one of an I(Intra-coded)-picture, a P(Predictive-coded)-picture, and a B(Bidirectionally Predictive-coded)-picture, the image playback apparatus comprising:

a buffer unit for buffering the moving picture data;

a decoder for reading out and decoding the moving picture data buffered by the buffer unit;

an output unit for outputting pictures decoded by the decoder to a subsequent stage; and a control unit that, when the image apparatus is instructed to operate in forward playback different from normal playback, is configured for:

controlling the buffer unit, concerning a last group of picture data in a normal playback order, to buffer all of the picture data, and, concerning groups of picture data except for the last group of picture data, to buffer part of the picture data including at least picture data classified into the I-pictures;

controlling the decoder, concerning the last group of picture data, to decode the picture data classified into the I-pictures or the P-pictures, and, concerning the groups of picture data except for the last group of picture data, to decode at least the picture data classified into the I-pictures; and controlling the output unit, concerning the last group of picture data, to output at least a last picture of moving pictures, and, concerning the groups of picture data except for the last group of picture data, to output at least pictures corresponding to the I-pictures.

5. The image playback apparatus according to claim 4, wherein the control unit is configured to specify picture types to be decoded for each group of picture data, and notifies the decoder of the picture types to be decoded in advance, and wherein the decoder is configured to read out and decode the moving picture data buffered by the buffer unit according to the notification from the control unit.

6. An image playback method for controlling an image playback apparatus having a decoder, an output unit, and a buffer unit for buffering moving picture data composed of a series of groups of picture data, each group comprising a plurality of pictures, each of which is classified into one of an I-picture, a P-picture, and a B-picture, the image playback method comprising the steps of:

when the image apparatus is instructed to operate in forward playback different from normal playback:

controlling the buffer unit, concerning a last group of picture data in a normal playback order, to buffer all of the picture data, and, concerning groups of picture data except for the last group of picture data, to buffer part of the picture data including at least picture data classified into the I-pictures;

controlling the decoder, concerning the last group of picture data, to decode the picture data classified into the I-pictures or the P-pictures, and, concerning the groups of picture data except for the last group of picture data, to decode at least the picture data classified into the I-pictures; and controlling the output unit, concerning the last group of picture data, to output at least a last picture of the moving pictures, and, concerning the groups of picture data except for the last group of picture data, to output at least pictures corresponding to the I-pictures.

7. A non-transitory computer-readable storage medium storing a program for controlling an image playback apparatus having a decoder, an output unit, and a buffer unit for buffering moving picture data composed of a series of groups of picture data, each group comprising a plurality of pictures, each of which is classified into one of an I-picture, a P-picture, and a B-picture, the program including instructions for a computer to execute a process comprising the steps of:

when the image apparatus is instructed to operate in forward playback different from normal playback:
controlling the buffer unit, concerning a last group of picture data in a normal playback order, to buffer all of the picture data, and, concerning groups of picture data except for the last group of picture data, to buffer part of the picture data including at least picture data classified into the I-pictures;
controlling the decoder, concerning the last group of picture data, to decode the picture data classified into the I-pictures or the P-pictures, and , concerning the groups of picture data except for the last group of picture data, to decode at least the picture data classified into the I-pictures; and
controlling the output unit, concerning the last group of the picture data, to output at least a last picture of the moving pictures, and, concerning the groups of picture data except for the last group of picture data, to output at least pictures corresponding to the I-pictures.

8. The image playback apparatus of claim 4, wherein, when the image apparatus is instructed to operate in a reverse playback different from the normal playback, the control unit is further configured to:
control the buffer unit to buffer, concerning a first group of picture data in the normal playback order, all of the picture data, and to buffer, concerning groups of picture data except for the first group of picture data, part of the picture data including at least the picture data classified into the I-pictures;
control the decoder to decode, concerning the first group of picture data, at least picture data corresponding to a first picture of the moving pictures, and to decode, concerning the groups of picture data except for the first group of picture data, at least the picture data classified into the I-pictures; and
control the output unit to output, concerning the first group of picture data, at least the first picture of moving pictures, and to output, concerning the groups of picture data except for the first group of picture data, at least the pictures corresponding to the I pictures.

9. The image playback method of claim 6, further comprising the steps of:
when the image apparatus is instructed to operate in a reverse playback different from the normal playback:
controlling the buffer unit to buffer, concerning a first group of picture data in the normal playback order, all of the picture data, and to buffer, concerning groups of picture data except for the first group of picture data, part of the picture data including at least the picture data classified into the I-pictures;
controlling the decoder to decode, concerning the first group of picture data, at least picture data corresponding to a first picture of the moving pictures, and to decode, concerning the groups of picture data except for the first group of picture data, at least the picture data classified into the I-pictures; and
controlling the output unit to output, concerning the first group of picture data, at least the first picture of the moving pictures, and to output, concerning the groups of picture data except for the first groups of picture data, at least pictures corresponding to the I-pictures.

10. The computer-readable storage medium of claim 7, wherein the process further comprises the steps of:
when the image apparatus is instructed to operate in a reverse playback different from the normal playback:
controlling the buffer unit to buffer, concerning a first group of picture data in the normal playback order, all of the picture data, and to buffer, concerning groups of picture data except for the first group of picture data, part of the picture data including at least the picture data classified into the I-pictures;
controlling the decoder to decode, concerning the first group of picture data, at least picture data corresponding to a first picture of the moving pictures, and to decode, concerning the groups of picture data except for the first group of picture data, at least the picture data classified into the I-pictures; and
controlling the output unit to output, concerning the first group of picture data, at least the first picture of the moving pictures, and to output, concerning the groups of picture data except for the first groups of picture data, at least pictures corresponding to the I-pictures.

11. The image playback apparatus of claim 1, wherein the playback order includes a sequence of all I(Intra-coded)-picture(s), P(Predictive-coded)-picture(s), and B(Bidirectionally Predictive-coded)-picture(s).

12. The image playback apparatus of claim 1, wherein the predetermined encoding method includes encoding a single I(Intra-coded)-picture for each group.

13. The image playback apparatus of claim 1, wherein an amount of time used for displaying picture data located at the end is reduced by not buffering the picture data located at the end using the predetermined encoding method.

14. The image playback method of claim 2, wherein the playback order includes a sequence of all I(Intra-coded)-picture(s), P(Predictive-coded)-picture(s), and B(Bidirectionally Predictive-coded)-picture(s).

15. The image playback method of claim 2, wherein the predetermined encoding method includes encoding a single I(Intra-coded)-picture for each group.

16. The image playback method of claim 2, wherein an amount of time used for displaying picture data located at the end is reduced by not buffering the picture data located at the end using the predetermined encoding method.

17. The computer-readable storage medium of claim 3, wherein the playback order includes a sequence of all I(Intra-coded)-picture(s), P(Predictive-coded)-picture(s), and B(Bi-directionally Predictive-coded)-picture(s).

18. The computer-readable storage medium of claim 3, wherein the predetermined encoding method includes encoding a single I(Intra-coded)-picture for each group.

19. The computer-readable storage medium of claim 3, wherein an amount of time used for displaying picture data located at the end is reduced by not buffering the picture data located at the end using the predetermined encoding method.

20. The image playback apparatus of claim 5, wherein the control unit notifies the decoder to operate in an I-picture decoding mode concerning groups of picture data except for the last group of picture data, and to operate in an I/P-picture decoding mode concerning the last group of picture data.

* * * * *